United States Patent

Crary et al.

Patent Number: 5,920,150
Date of Patent: *Jul. 6, 1999

[54] FLUORESCENT AUTOMOTIVE DISPLAY PANEL

[75] Inventors: Kevin E. Crary, LaCrosse; Arnis E. Peters, Sparta, both of Wis.

[73] Assignee: Northern Engraving Corporation, Sparta, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/731,410

[22] Filed: Oct. 15, 1996

Related U.S. Application Data

[63] Continuation of application No. 08/377,660, Jan. 25, 1995, abandoned.

[51] Int. Cl.$^6$ ................................................. H01J 1/62
[52] U.S. Cl. ..................... 313/484; 313/486; 313/117; 359/232; 362/30
[58] Field of Search ............... 106/21 R, 21 A, 106/31.15, 31.24; 252/301.4 R; 523/160, 161; 524/80; 313/483, 489, 484, 486, 117; 359/227, 238, 438, 232; 427/68, 157; 362/23, 30

[56] References Cited

U.S. PATENT DOCUMENTS

| | | | |
|---|---|---|---|
| 2,302,645 | 11/1942 | Switzer et al. | 427/157 |
| 3,970,856 | 7/1976 | Mahaffey et al. | 250/493.1 |
| 4,048,537 | 9/1977 | Blaisdell et al. | 313/312 |
| 4,186,020 | 1/1980 | Wachtel | 106/21 A |
| 4,209,551 | 6/1980 | Masaki et al. | 427/68 |
| 4,224,553 | 9/1980 | Hellwig | 313/489 |
| 4,298,650 | 11/1981 | Lu | 427/157 |
| 4,627,642 | 12/1986 | Peronneau et al. | 428/201 |
| 4,841,155 | 6/1989 | Ushida et al. | 250/463.1 |
| 4,986,631 | 1/1991 | Aoki et al. | 359/438 |
| 5,029,008 | 7/1991 | Ferren | 362/23 |
| 5,166,456 | 11/1992 | Yoshino | 252/301.4 R |
| 5,227,767 | 7/1993 | Tanaka | 345/151 |
| 5,635,006 | 6/1997 | Watanabe et al. | 427/68 |

FOREIGN PATENT DOCUMENTS

| | | | |
|---|---|---|---|
| 87102047 | 2/1987 | European Pat. Off. | C09J 7/02 |
| 79-05039B [03] | 3/1979 | Japan . | |
| 94-072128 [09] | 9/1994 | Japan | C09D 77/00 |

Primary Examiner—Sandra O'Shea
Assistant Examiner—Michael Day
Attorney, Agent, or Firm—McDonnell, Boehnen, Hulbert & Berghoff

[57] ABSTRACT

An automobile dashboard display device including a panel that includes indicator numerals and letters that are printed with an acrylic resin bound phosphor pigment wherein the display is illuminated with ultraviolet light.

13 Claims, 1 Drawing Sheet

FLUORESCENT AUTOMOTIVE DISPLAY PANEL

This is a continuation of application Ser. No. 08/377,660, filed Jan. 25, 1995, now abandoned.

BACKGROUND OF THE INVENTION

This invention relates to automotive display panels, such as dashboards panels, and more particularly to the constructions by which such panels are made visible at night.

Automotive display panels, where "automotive" connotes cars, trucks, motorcycles, and vehicles generally, currently are formed of materials such as clear polycarbonate. The clear polycarbonate is decorated front and back for day and night-time displays. The decoration on the front includes daytime information, on a background, typically black. The daytime information is formed of pigmented inks, screen printed on the panels in desired colors, typically white. The decoration on the back of the panels includes nighttime information, again in pigmented inks, provided to be visible through the panel under back lighting. Decoration on the panel backs allows nighttime colors such as red and green to be different from daytime white.

Compensation is also printed on the panel back. This compensation allows substantially equal brightness across the panel under back lighting, even though the back lighting may be uneven. As an example, some panels are back lit from the side. Further, warning displays known as telltales, are provided, to be visible under illumination of warning lights.

Automotive display panels as described are the standard of the automotive industry, given the rigorous performance standards of that industry. Panels as described are a desirable combination of materials able to survive automotive quality control requirements at affordable pricing. Such quality control requirements include temperature testing for survival in hostile, steady-state heat and freezing; hostile temperature cycling; sustained high humidity; sustained intense lighting; and combinations of lighting, temperature, humidity, and water spray.

This standard of the industry is not without deficiencies and costs. As an example, as indicated, compensation is required for adequately uniform back lighting. However, despite deficiencies and costs, alternative panels and lighting schemes are not known to the commercial automotive industry. Among other screens not known, fluorescent displays are not known. A variety of patents disclose fluorescent lighting of indicia such as automotive instrumentation information, but the inventions of such patents have not been adopted in commercial applications. Inability to satisfy quality control requirements at competitive pricing is believed to be the primary reason for the lack of adoption. Use of ultraviolet lighting which is unsuitable to close proximity to drivers and passengers is believed to further contribute to the situation.

SUMMARY OF THE INVENTION

An object, then, of the present invention, is to provide fluorescent displays for automotive instrumentation which satisfy quality control requirements at competitive pricing.

Another object is to provide fluorescent lighting which avoids lighting unsuitable for the intended application.

These and other objects are satisfied in an invention which, in a principal aspect, takes the form of a fluorescent display device which comprises a long-wave ultraviolet light source and a display panel. The panel is imprinted with a fluorescent ink display, the ink including long-wave activated inorganic phosphor pigment, and acrylic resin. The ink is fluorescent under long-wave ultraviolet radiation. The ultraviolet light source is positioned relative to the display panel to illuminate the display with long-wave ultraviolet light, from the front. In more particular embodiments, the ink of the fluorescent display has all the particular features described hereafter.

In another principal aspect, the present invention takes the form of a specific fluorescent ink. The invented ink comprises, as primary constituents, long-wave activated inorganic phosphor pigment and acrylic resin, with the ink being fluorescent under long-wave ultraviolet radiation. As preferred, the fluorescent ink further comprises visible-light activated pigment, and the acrylic resin is transparent to long-wave ultraviolet radiation. Also as preferred, the inorganic phosphor is rare-earth doped, and there are additives selected from among the group of flow agents, foam suppressants, and surfactants.

As most preferred, the fluorescent ink comprises a mixture of long-wave activated, rare-earth doped, inorganic phosphor pigment, visible-light activated pigment, and acrylic resin at least partially transparent to long-wave radiation, with the proportion of visible-light activated pigment and the proportion of phosphor pigment relative to each other being established to provide fluorescence of the ink. The ink is screen-printable, the pigments having particle sizes less than 15 microns, and the phosphor pigment is selected from among the group comprising red, green and blue phosphor pigments, the proportions of the red, green and blue phosphor pigments relative to each other being established to provide desired color of fluorescence of the ink. Still further, the phosphor pigment is photostable, white body color pigment, inert to moisture, and selected from among the group comprising $Y_2O_2S:Eu$, $Zn_2GeO_4:Mn$, $BaMg_2Al_{16}O_{27}:Eu$ and $3(Ba,Mg)0.8Al2O3:Eu$, Mn. The light source emits 340 to 380, and most preferably 365, nanometer light.

The ink of the invention is printed on the face of the invented display panels. Only telltales are printed on the back of the panels. All other back printing is eliminated. Back lighting is eliminated. Satisfying illumination levels are obtained in ambient light, and in ultraviolet light. Multiple applications of different inks, to gain desirable daytime displays and desirable nighttime displays, are unnecessary. Color changes between day and night are possible, and may even include color "flips" between white and virtually any desired color. Refined displays are also possible, as sizes of pointers and informational markings are adapted to the ink of the invention.

The full range of objects, aspects and advantages of the invention are only fully understood by a reading of the detailed description of the preferred embodiments of the invention. That description follows.

BRIEF DESCRIPTION OF THE DRAWING

The preferred embodiments of the invention will be described in relation to the accompanying drawing. The drawing includes figures, as follows.

DETAILED DESCRIPTION OF THE PREFERRED EMBODIMENT

Figure 1:
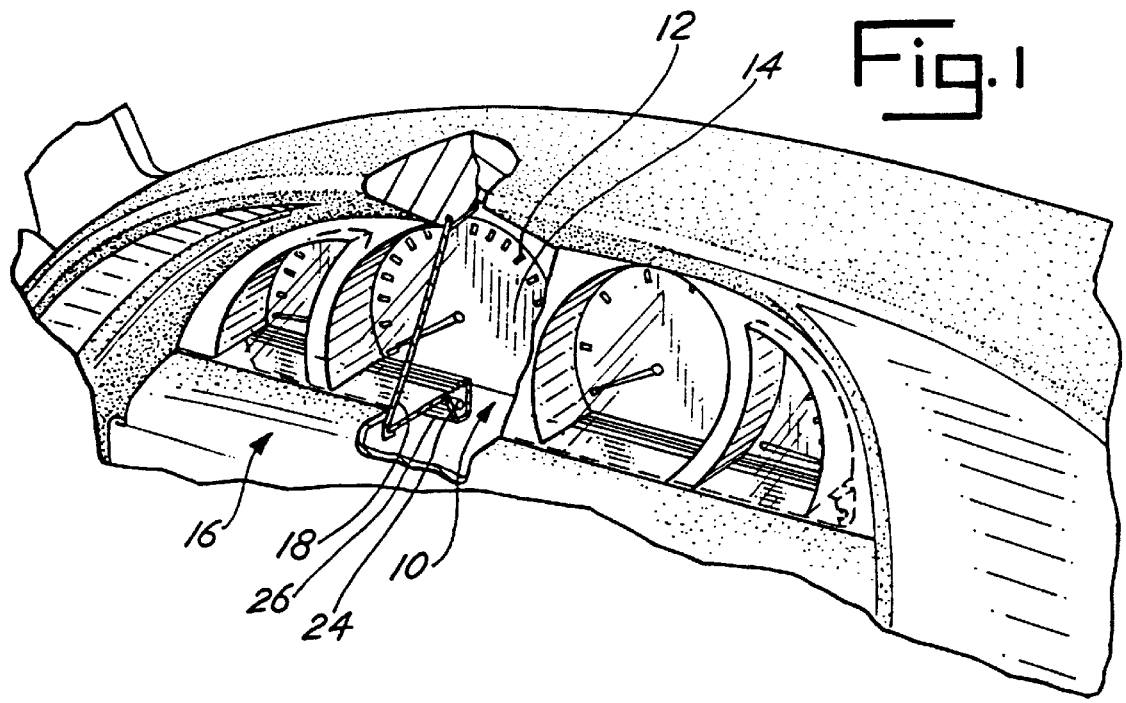
FIG. 1 is a perspective view of a typical automotive display panel, decorated according to the invention, with a central portion broken away to reveal internal detail.
Figure 2:
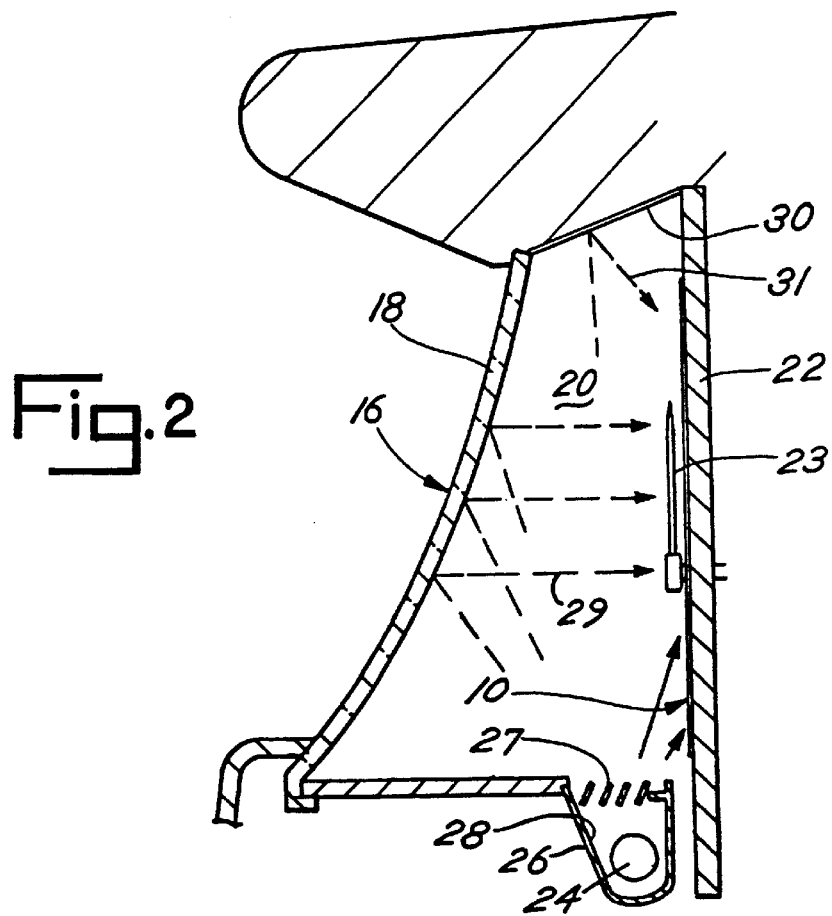
FIG. 2 is a cross-section view of an automotive display panel according to the invention and as in FIG. 1.

Referring to FIGS. 1 and 2, the preferred embodiment of the present invention includes both a fluorescent ink for a display device, and a display device comprising fluorescent ink.

In a preferred display as in FIG. 1, a panel 10 such as an automotive instrument display panel incorporates indicia 12 and a background 14. As most preferred, both the background 14 and indicia 12 are on a polycarbonate substrate. The background 14 is black ink, and the indicia 12 are formed according to the invention with inks comprising resin, phosphor pigments, and transparent pigments. The transparent pigments supply colors to the indicia under ambient, daytime lighting, and the phosphor pigments supply colors to the indicia under ultraviolet lighting. Less preferred, available substrates include acrylic, aluminum, polyester and the like.

Referring to FIGS. 1 and 2 both, a display device 16 incorporates the panel 10 in combination with additional elements, to form an instrument panel suitable for day and nighttime operation of a car. A viewing panel 18, such as a formed sheet of clear plastic, defines a surface near an observer, such as an automobile operator (i.e., a driver).

A space 20 exists behind the panel 18, which defines the interior of the display device 16. A rear wall 22, and surrounding top, bottom and side walls complete the definition of the interior 20. As necessary, working elements such as speedometer needle 23 extend into the space 20.

The display panel 10 is mounted on or comprises the rear wall 22 of the display device 16. As above, the display panel 10 incorporates indicia 12 formed of inks comprising daytime and fluorescent pigments. An ultraviolet light source 24, such as a black light tube, extends along the bottom of the interior space 20, inside a reflector housing 26. The light source 24 emits 340 to 380, and most preferably 365, nanometer light, under the control of the driver, through the operation of a switch (not shown). Thus, as desired, the driver may actuate the light source 24 as needed, typically at night.

Referring again to FIG. 2, the light source 24 is in front of the display panel 10, where "in front of" has the meaning of the light source being positioned proximate the face of the display panel 10, i.e., on the "side" of the display panel nearer the observer, i.e., the driver. As shown, the light source 24 may be offset laterally to the bottom, top, or side of the panel 10, while remaining in front of the panel 10.

Ultraviolet light from the source 24 radiates off the source 24, onto the panel 10. Radiation may be direct, if so desired, but is preferred to be indirect. Louvers 27 may be, and most preferably are, interposed between the light source 24 and panel 10, and prevent direct radiation of light from the source 24 onto the panel 10. Alternately, light from the source 24 reflects onto the housing 26, which incorporates a reflective surface 28. Light also radiates onto the inner surface of the viewing panel 18, which itself reflects light onto the panel 10, as represented by arrows 29. Light finally radiates to an opposed reflective surface 30, opposite the light source 24 across the span of the display panel 10, and thereby onto the panel 10, as represented by arrow 31.

All of the reflective surface 28, viewing panel 18, and opposed reflective surface 30 are angled, arranged and composed to reflect ultraviolet light onto the display panel 10, and thereby the indicia 12. In the daytime, in ambient light, the indicia 12 are visible on the background as a result of the daytime pigments of the indicia's ink. At night, under the light of the ultraviolet source 24, the indicia 12 fluoresce, and are visible as fluorescent, as ultraviolet light reflects off the fluorescent pigments of the ink. Because the source 24 emits low intensity, 365 manometer light, night viewing is safe and vivid.

An ink according to the present invention incorporates a resin, preferably an acrylic resin. A particularly desired resin is available from Summit Screen Inks, of North Kansas City, Mo., as K-89510 Plas-Tec Clear resin. K-89510 Plas-Tec Clear resin is a formulation of K-85541 Plas-Tec Mixing Clear resin, without flow agents or bubble breaker additives. K-89510 is also a proprietary blend of Summit Screen Inks, of acrylic resins, without any substantial vinyl modification or alkyd modification. K-89510 Plas-Tec Clear Resin has a manufacturing viscosity of Z1-Z2 Gardner Holdt (bubble type) and a density of 8.3 pounds per gallon. While the identified resin is preferred, as is acrylic resin, it is believed possible to employ epoxies, urethanes and acrylic resins, although vinyl modified or alkyd modified resins are not, at this time, considered to be suitable.

Daytime color pigments may be added to the resin, as are phosphors and additives. Preferred daytime color pigments are transparent pigments. These pigments are "transparent" in that they pass 365 nanometer ultraviolet light. Desirable transparent pigments are available from Summit Screen Inks at K-85530, 31, 32, 33, 34, 35, 36 37, 38, 39, 40, 74 and 75 Plas-Tec Ink Toners. All the identified pigments have excellent light fastness.

Preferred phosphor pigments ("phosphors") are also added to the resin. Preferred phosphors are photostable, white in body color, and insert to moisture. Most preferred are $Y_2O_2S$:Eu, $Zn_2GeO_4$:Mn, $BaMg_2Al_{16}O_{27}$:Eu and 3(Ba, Mg)0.8Al2O3:Eu, Mn. Less preferred are ZnO:Zn, $Sr_5(PO_4)_3$ Cl:Eu and $Y_2O_2S$:Eu. These phosphors are "white in body color" in that they exhibit a milky white appearance in ambient light. Under ultraviolet light, $Y_2O_2S$:Eu is red, $Zn_2GeO_4$:Mn is green, $BaMg_2Al_{16}O_{27}$:Eu is blue, and 3(Ba, Mg)0.8Al2O3:Eu, Mn. is also green.

Whether daytime color pigments are to be added is a matter of choice, dependent on the daytime color desired for the ink and the resulting display. In the absence of daytime color pigments, the white body color of the phosphors gives the indicia 12 a white appearance. Where daytime color pigments are desired, to achieve a particular daytime color, the color co-ordinates of the desired color are identified—using a color-coordinate scheme which plots colors on a color space, such as CIE 1931, and assigns co-ordinates to the colors—and combinations of daytime color pigments are added to achieve the desired co-ordinates. As necessary, spectrophotometry is used to identify the color co-ordinates of the resin-pigment mixture resulting from a first combination of resin and daytime color pigment(s), and iteration between pigment addition and spectrophotometric analysis is used to correct the resin-pigment mixture to the desired daytime color. Phosphor pigments are added to the resin system in a preferred proportion of 4–6 parts total phosphor to 4 parts resin system. Excess phosphor results in a paste, while excess resin results in an undesirable graininess of phosphor. Intuitively, the proportions of phosphor to resin system are believed to range suitably between 3:7 and 3:1 parts of resin system to parts of phosphor. The desired proportions of 4:6 resin to phosphor is believed to provide a most desirable combination of workability and nighttime brightness.

As with the daytime pigments, the phosphor pigments may be combined to achieve a specific desired phosphor color. The color co-ordinates of the desired color are identified. Using 365 nanometer black light, an estimate of the combination of red, blue and green phosphors necessary to achieve these color co-ordinates, and the combination, with resin, is created. The color is examined by spectrophotometry and as necessary, iteration between spectrophotometry and pigment combination is used to achieve the desired color. Only one green is used, in combination with a red and a blue, to achieve desired color. Of the two preferred green phosphors, the green is chosen which permits achievement of desired color. Where possible, $Zn_2GeO_4$:Mn is used. As preferred, the process is aided by the technique known as the designed experiment technique, as explained, for example, in the test "Design of Experiments", the computer program XStat of the publisher Wiley, and "How To Run Mixture Experiments for Product Quality" by John A. Cornell, Am. Soc. for Q.C., Statistics Division, Milwaukee, Wis., 1990. Also as most preferred, the spectrophotomer utilized is a Photo Research model 704, and analysis occurs in a darkroom.

As above, without daytime pigments, daytime color is white. Added daytime pigments result in a daytime color which may be the same as, or different from nighttime fluorescent color. Limitations of such color "flips" result from daytime pigments shifting the emissive, nighttime color toward the daytime color. A non-white daytime color and a white nighttime color are not thought to be possible in combination.

With resin and pigments, i.e., inks, as provided, where particle size is held to less than 15 microns, all indicia 12 to be created can be created by screen printing. Alternatives to screen printing, such as pad printing, dip coating and the like are also viable. With a panel which is to have some fluorescent markings and some non-fluorescent markings, or fluorescent markings of differing colors, multiple screen printings are suitable. All decoration is accomplished, however, on a single surface, or otherwise as desired. Unlike past display decorations, back surface decoration for any nighttime graphics may be eliminated.

The described phosphors are readily combined with resin through mixing, with slow addition of phosphor during stirring with a high speed disperser.

The preferred embodiment, and the manner of making and using it, are now described. To particularly point out and distinctly claim the subject matter regarded as invention, the following claims conclude this specification. Numerous variations in the specific details of the invention and its application will be understood to be within the spirit and scope of the invention and the claims.

What is claimed is:

1. An automotive display panel comprising:
a light source that emits ultraviolet light having a wavelength of 340 to 380 nm;
a display panel, the panel imprinted with a display, the display including at least one indicia imprinted by fluorescent ink, the ink including long-wave activated inorganic phosphor pigment, and a resin consisting essentially of acrylic resin, the ink being fluorescent under ultraviolet radiation having a wavelength of from 340 to 380 nm the light source positioned relative to the display panel to illuminate the display with ultraviolet light; and
a plurality of louvers interposed between the light source and the display panel.

2. An automotive display panel comprising:
a light source that emits ultraviolet light having a wavelength of 340 to 380 nm; and
a panel that is illuminated by the light source, the panel including at least one indicia printed with fluorescent ink, the ink including 4–6 parts by weight of at least one long-wave light activated inorganic phosphor pigment, and 4 parts by weight of a resin consisting essentially of acrylic resin, the ink being fluorescent under ultraviolet radiation having wavelength of from 340 to 380 nm, the light source positioned relative to the panel to illuminate the panel with ultraviolet light.

3. An automotive display panel as in claim 2, the ink further comprising visible light activated pigment.

4. An automotive display panel as in claim 2 wherein the acrylic resin of the ink is transparent to long-wave ultraviolet radiation.

5. An automotive display panel as in claim 2 wherein the inorganic phosphor of the ink is rare-earth doped.

6. An automotive display panel as in claim 2 wherein the ink further comprises additives selected from among the group of flow agents, foam suppressants, and surfactants.

7. An automotive display panel as in claim 2, the ink comprising a mixture of long-wave activated, rare-earth doped, inorganic phosphor pigment, visible-light activated pigment, and acrylic resin at least partially transparent to long-wave radiation, the ink being fluorescent under long-wave ultraviolet radiation.

8. An automotive display panel as in claim 7, the proportion of visible-light activated pigment and the proportion of phosphor pigment relative to each other being established to provide fluorescence of the ink.

9. An automotive display panel as in claim 7, the ink being screen-printable fluorescent ink, the pigments having particle sizes less than 15 microns.

10. An automotive display panel as in claim 7, the phosphor pigment of the ink being selected from among the group comprising red, green and blue phosphor pigments, the proportions of the red, green and blue phosphor pigments relative to each other being established to provide desired color of fluorescence of the ink.

11. An automotive display panel as in claim 7, the phosphor pigment being photostable pigment.

12. An automotive display panel as in claim 7, the phosphor pigment of the ink being white body color pigment.

13. An automotive display panel as in claim 7, the phosphor pigments of the ink being selected from among the group comprising $Y_2O_2$:Eu, $Zn_2GeO_4$:Mn, and $BaMg_2Al_{16}O_{27}$:Eu.

* * * * *